Figure 1:
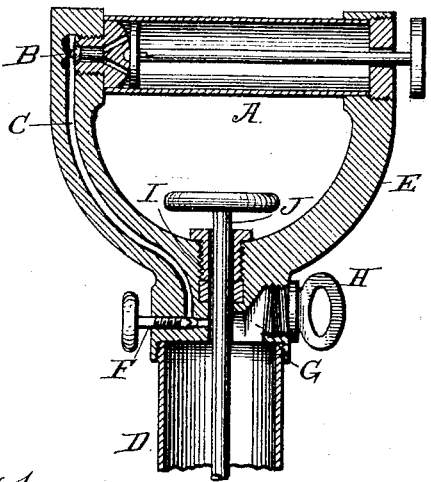

No. 785,827. PATENTED MAR. 28, 1905.
H. G. PARKER & E. V. GARNETT.
SELF HEATING BRANDING IRON.
APPLICATION FILED OCT. 22, 1902.

Witnesses:

Inventors:
Harry George Parker
Edward Vactor Garnett

No. 785,827. Patented March 28, 1905.

UNITED STATES PATENT OFFICE.

HARRY GEORGE PARKER, OF LIBERTY, MISSOURI, AND EDWARD VACTOR GARNETT, OF PUEBLO COUNTY, COLORADO.

SELF-HEATING BRANDING-IRON.

SPECIFICATION forming part of Letters Patent No. 785,827, dated March 28, 1905.

Application filed October 22, 1902. Serial No. 128,368.

*To all whom it may concern:*

Be it known that we, HARRY GEORGE PARKER, residing at Liberty, in the county of Clay and State of Missouri, and EDWARD VACTOR GARNETT, residing in the county of Pueblo, in the State of Colorado, citizens of the United States, have jointly invented a new and useful Self-Heating Branding-Iron, of which the following is a specification.

Our invention relates to improvements in self-heating branding-irons.

It is customary to brand animals with some letter, symbol, figure, or other proprietary mark. This is sometimes done with a heated "stamp-iron," by which the desired mark is made by impressing the iron momentarily on the surface to be branded. At other times the design is traced on the animal by sliding a heated iron bar or ring over the surface to be branded, and the instrument by which this is done is called a "running-iron," and thus distinguished from the stamp-iron. In order to make a proper brand, it is necessary that the iron in either case be heated to and kept uniformly at just the right temperature while being applied to the animal. This is very difficult under the old method of heating, especially so with the running-iron when the brand is being slowly traced. It is often necessary to reheat the running-iron several times while tracing one brand, the confined animal struggling all the while to escape the torture. Generally the branding is done on the ranges of the prairie, where all kinds of fuel are scarce and very difficult to obtain. After the animal is caught and secured much time is consumed before the fuel can be gathered, the fire made, and the iron heated. To remedy these difficulties, attempts have been made to provide self-heating branding implements carrying a stamp-iron with unsatisfactory results; but no attempts have been made to provide a self-heating branding implement of any kind carrying a running-iron prior to our application herein.

The object of our invention is to obviate the foregoing difficulties and objections and others which might be urged against the present system of branding animals and to provide a self-heating branding implement carrying the fuel in a cylindrical handle of such shape and proportions as to be conveniently carried by herdsmen and operated under the difficulties which they necessarily encounter.

Another object of the invention is to provide an improved self-heating branding implement, comprising a fuel-reservoir to be used as a handle, to which is attached at one end a transverse handle for guiding the iron and in which is arranged a compression air-pump and which terminates at the other end in an oil-burner to which either a stamp-iron or a running-iron may be either permanently or detachably secured for branding animals.

A further object of the invention is to provide a self-heating branding implement by means of self-contained liquid fuel, all of the parts of which are on line, so that it presents no abrupt angles nor projections to interfere with its free use in branding animals.

The object of the invention is also to provide a self-heating branding implement in which the valve-stem for regulating the supply of fuel passes on a straight line entirely through the cylindrical handle containing the fuel, terminating in a needle-point in the combustion-chamber at one end and passing through a stuffing-box terminating in a handle with which to operate it at the other end, so that the stuffing-box and handle are both removed from the heated portion of the implement. The fuel is turned off and on by this handle and the heat regulated.

We attain these objects by the mechanism illustrated in the accompanying drawings, in which—

Figure 2:
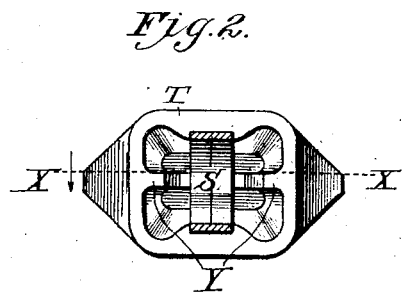
Figure 3:
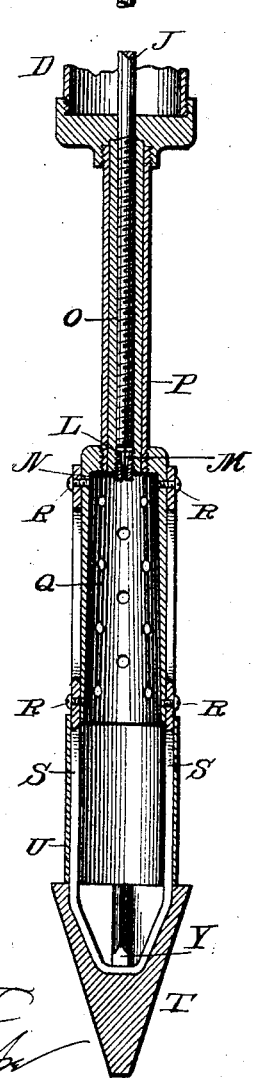
Figure 3:
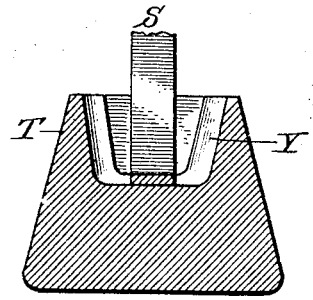

Figure 1 is a vertical section of the entire instrument centrally divided in barrel D; Fig. 2, a top view of the branding-head of the running-iron; Fig. 3, a section of the branding-head of the running-iron on the line X X in Fig. 2; and Fig. 4, a section of the stamp-branding head, which can be substituted in place of the running-iron head when desired.

Similar letters refer to similar parts throughout the several views.

In Fig. 1 we have the air-pump A, communicating, through a check-valve B and an air-passage C in the handle of the iron, with the barrel D. The handle E further contains an air-set valve F to stop any leakage backward from the barrel D through the air-passage C and also a filling-vent G, closed by a plug H. Passing through the stuffing-box I is the stem of the burner-valve J, which continues downward through the barrel D and is externally threaded at its lower end and adapted to engage the seat L and provided with a projecting needle M, which is employed to regulate the supply of fuel and also to clean out any dirt that may accumulate in the burner-valve seat-nipple proper, N. The threaded part of the valve-stem J engages an internally-threaded sleeve or lining O, contained in and solidly joined to the pipe P, which is fastened to and projects from the barrel D. Attached to the pipe P is an elongated combustion chamber or tube Q, perforated with holes for the purpose of admitting air and permitting the escape of a portion of the ignited gases. Attached to the combustion-chamber Q by means of screws R are extension-pieces S, which carry the branding-head T and are themselves surrounded by a hollow cylindrical wind-shield U, through which the burning gas passes into the recessed portion of the branding-head T and is deflected back into the atmosphere, the said wind-shield preventing lateral displacement of the flame. In the hollow or recessed portion of the branding-head T of the running-iron there project fins Y to increase the heating-surface.

Figure 4:
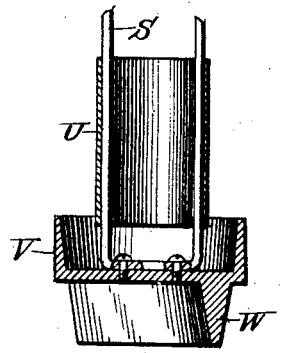

In Fig. 4 the stamp-head consists of a shallow flame-tray V, into which the flame passes and to the other side of which is attached the branding device W, which can be made of any character desired to be used as a brand.

Figs. 2 and 3 are designed to represent the branding-head of a running-iron, by which the character desired is made by sliding the same over the surface to be branded.

We operate the branding-iron in the following manner: Volatile liquid fuel, usually gasolene, is placed in the barrel D through the filling-vent G. Pressure of air is produced on the surface of the fuel by means of the air-pump A, the air-set valve F being momentarily opened for the purpose. The burner-valve J is opened, when the combustible gases passing from the orifice in the burner-valve nipple N are ignited and pass through the combustion-chamber Q into the recess in the branding-head T or W, which are thereby heated, the flame playing on and around the fins or projections Y. It is to be noted that the friction of the fuel in passing through the narrow space between the external threads on the valve-stem J and the internal threads upon the sleeve O, engaging the same, renders the supply of fuel steady when the valve is opened and prevents the backward flow of gas and also obviates the use of packing usually employed in gasolene-burners. The handle of the burner-valve is located remote from the heated portions of the iron in its transverse handle, where it is kept cool and easily operated.

Having fully described our invention and explained its objects, we do not wish to limit ourselves to the precise construction shown in the drawings, as many modifications could be made without departing from the spirit and scope of the invention; nor do we claim, broadly, the invention of a self-heating implement carrying a stamp-iron.

What we do claim, and desire to secure by Letters Patent, is—

1. A self-heating branding implement, comprising, a cylindrical barrel containing the fuel, to which is attached at one end an air-compression pump, and terminating at the other end in a projection carrying a generating-chamber and an oil-burner to which is secured a branding-head, in combination with a valve for regulating the supply of fuel, the stem of which passes longitudinally through the fuel-reservoir and generating-chamber, substantially as described.

2. A self-heating branding implement, comprising a cylindrical barrel containing the fuel to which is attached at one end an air-compression pump, and terminating at the other end in a projection carrying an oil-burner to which is secured a branding-head, in combination with a valve in which the externally-threaded valve-stem engages an internally-threaded sleeve and through which the supply of fuel passes, for the purposes specified.

3. A self-heating branding implement, comprising, a cylindrical barrel containing the fuel terminating at one end in a projection carrying an oil-burner to which is secured a branding-head, in combination with an air-compression pump attached to the other end of the barrel by projecting lugs, serving as a transverse handle for manipulating the branding implement, substantially as set forth.

In testimony whereof we have signed our names to this specification in the presence of two subscribing witnesses.

HARRY GEORGE PARKER.
EDWARD VACTOR GARNETT.

Witnesses:
W. O. HAMILTON,
M. R. H. GARNETT.